Patented Jan. 7, 1947

2,414,050

UNITED STATES PATENT OFFICE 2,414,050

CONDENSATION DERIVATIVES OF ORGANIC QUATERNARY AMMONIUM COMPOUNDS

Adrian Laverne Linch, Wilmington, Del., assignor to E. I. du Pont de Nemours & Company, Wilmington, Del., a corporation of Delaware No Drawing. Application July 20, 1942, Serial No. 451,680

4 Claims. (Cl. 260—314.5)

This invention relates to condensation compounds comprising a quaternary ammonium radical having a dye radical attached thereto through an amide group, and processes for their preparation.

It is an object of this invention to produce a class of new condensation compounds which have a variety of uses in the industrial arts. A further object is to produce quaternary ammonium derivatives which are of particular value in the dyeing of textiles and other materials. A still further object is to produce a class of dyestuffs having improved characteristics. A still further object is to produce known compounds by a new and improved process. A still further object is to produce amides in a simple, economical and expeditious manner. Additional objects will become apparent from an examination of the following description and claims.

These objects are attained in accordance with the present invention wherein quaternary ammonium compounds containing a condensable acid halide group are condensed with a primary or secondary organic amine. In a more restricted sense these objects are attained by producing quaternary ammonium compounds having a dye radical attached thereto through an acyl amido or sulfonyl amido group. In a still more restricted sense these objects are achieved by condensing a quaternary ammonium compound having substituted thereon a carbonyl chloride, carbonyl bromide, sulfonyl chloride or sulfonyl bromide group with a phthalocyanine dye. In its preferred embodiment this invention comprises the condensation of a betainyl chloride with a dye containing a primary or secondary amino group, and in particular a phthalocyanine dye.

The invention may be more readily understood by a consideration of the following illustrative examples wherein the quantities are stated in parts by weight. In certain of these examples equations are given to represent the probable reaction which takes place therein.

EXAMPLE 1

N-chloro-betaine anilide

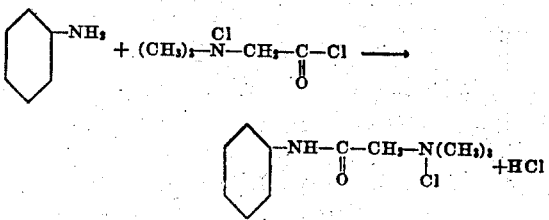

A mixture composed of 90 parts of dry benzene, 8.6 parts of N-chlorobetainyl chloride (prepared according to Example 1 of my copending application, Serial No. 451,682, filed July 20, 1942, entitled Organic quaternary ammonium derivatives), 4.7 parts of aniline and 12.1 parts of dimethyl aniline is heated at 70–75° under reflux for two hours. The mixture is cooled to room temperature and filtered. The crude product is purified by first extracting with 160 parts of dry acetone, then crystallizing from a mixture of 120 parts of acetone and 12 parts of methyl alcohol. In this manner a high yield of N-chlorobetaine anilide is obtained which may be further purified by dissolving in water and neutralizing with sodium carbonate.

By substituting other quaternary ammonium substituted carbonyl or sulfonyl chlorides such as disclosed in my copending application previously referred to, a great variety of acyl and sulfonyl anilides containing a pentavalent nitrogen atom unsubstituted by hydrogen may be synthesized. For example, N-bromo-C-tetradecyl betainyl chloride (Example 4) condenses with aniline to yield the corresponding N-bromo-C-tetradecyl betaine anilide or N-chloro-N-benzyl betainyl chloride may be condensed with parachloro-aniline to produce the corresponding N-chloro-betaine parachloro-anilide.

The quaternary ammonium sulfonyl chlorides behave in an analogous manner. For example, by the above process phenyl benzyl dimethyl ammonium sulfonyl anilide sulfate is produced from the condensation of aniline with phenyl benzyl dimethyl ammonium sulfate sulfonyl chloride (Example 9 of the aforesaid copending application). Other substituted anilides are prepared in a similar manner.

EXAMPLE 2

N-chloro-betaine-3-nitro-4-methoxy-anilide

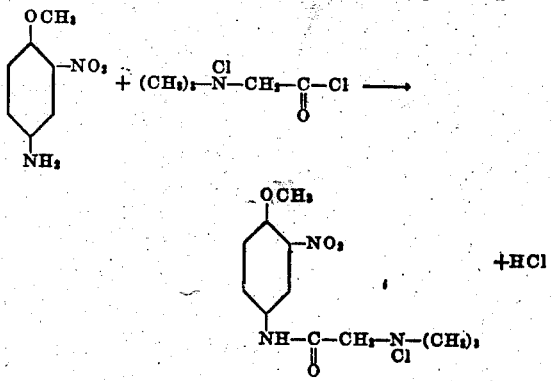

Twenty-five parts of 3-nitro-para-anisidine and 30 parts of N-chloro-betainyl chloride (prepared according to Example 1 of the aforementioned copending application), are suspended in 150 parts of dry toluene. This mixture is heated to boiling under reflux over one and one-half hours and held on temperature 1½ hours. Hydrochloric acid gas is evolved rapidly during the early stages of heating, and the color changes from orange-red to white. The mixture is filtered and the crude product crystallized from 150 parts of water. Twenty-four parts of N-chloro-betaine 3-nitro-4-methoxy anilide melting at 221.0° C. is obtained.

Analysis: Per cent chlorine—found 11.76—theory 11.68; per cent —NO$_2$ (by TiCl$_3$) found 15.08—theory 15.12.

An additional 22 parts of product may be recovered by evaporating the aqueous mother liquors.

In a similar fashion N-chloro-betaine alpha naphthalide, N-chloro-betaine beta-naphthalide, N-chloro-betaine 2,5-dichloroanilide, N-chloro-betaine 2-nitro-4-methyl anilide, N-chloro-betaine anilide 4-carboxylic acid, alpha (N-chloro-betainyl) amino pyridine, etc. may be prepared in good yields in high states of purity.

EXAMPLE 3

*N-chloro-betaine meta-nitro-anilide*

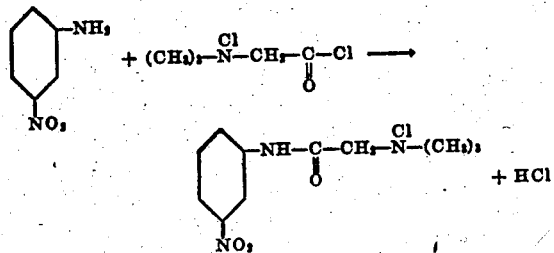

Twenty-eight parts of meta-nitro-aniline, 52 parts N-chloro-betainyl chloride and 90 parts of toluene are intimately mixed by grinding in a ball mill for 24 hours. The product is recovered by filtration, and extracted with toluene in a Soxhlet apparatus to remove any unreacted meta-nitro-aniline. A nearly quantitative yield of product melting at 185–187° C. is obtained. The crude product is purified by crystallization from 300 parts of water. The crystals melt at 180–183° C.

Analysis: Percent nitrogen found 15.13—theory 15.38; percent chloride found 13.31—theory 13.0.

By following this procedure or the procedure of Example 2, anilides and substituted aryl amides are prepared from a variety of other quaternary ammonium substituted carbonyl and sulfonyl halides such as N-chloro-(N'-chloro-betainyl)-betainyl chloride (Example 2), betainyl chloride hydrogen sulfate (Example 3), N-chloro-sulfo-betainyl chloride (Example 8), betainyl chloroformate chloride and the corresponding bromide derivatives described in my copending application previously referred to.

EXAMPLE 4

*N-chloro-betaine diphenylamide*

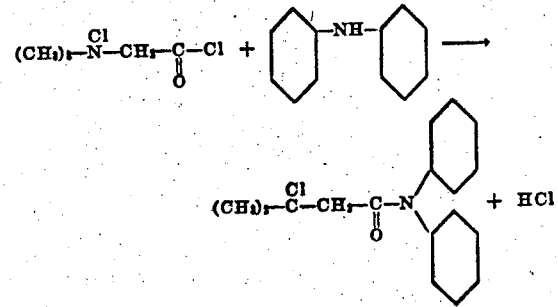

Forty-one parts diphenylamine and 100 parts N-chloro-betainyl chloride are suspended in 200 parts of toluene, the mixture heated to boiling under reflux over 1¼ hours, and held on temperature 4 hours. The product is recovered by filtration and washed with 100 parts of toluene. A quantitative yield of N-chloro-betaine diphenylamide is obtained.

If in place of diphenylamine one of a variety of other secondary amines such as methyl octadecylamine, butylaniline, beta-hydroxy-ethyl aniline, phenyl alpha-naphthylamine, 4,4'-dimethoxy diphenylamine, meta-nitro-methyl-aniline, dioctylamine, N-butyl glycine, etc. is used, the corresponding substituted N-chloro-betaine amide is obtained.

EXAMPLE 5

*N-chloro-N-benzyl betaine meta-nitro-anilide*

12.5 parts of N-chloro-N-benzyl betainyl chloride (prepared according to Example 5 of my copending application previously referred to), and 6.9 parts meta-nitro-aniline are suspended in 43 parts of dry toluene. An exothermic reaction sets in at once. The mixture is heated to boiling under reflux and held on temperature 1¼ hours. The product is recovered in a quantitative yield by filtration of the reaction mixture. The product may be purified by crystallization from 250 parts of water. The purified material melts at 195° C. and contains one molecule of water of hydration.

Analysis: Percent nitrogen found 11.49—theory 11.45; percent chlorine found 9.23—theory 9.67.

The preparation of similar derivatives may be carried out as described above, or by modifications. For example, N-chloro-N-(para-nitrobenzyl)-betaine meta-nitro-anilide is prepared by condensing 67.6 parts of N-chloro-N-(para-nitrobenzyl)-betainyl chloride with 27.6 parts of meta-nitro-aniline in 70 parts of boiling pyridine for 2 hours.

A variety of quaternary ammonium substituted amides are available by condensing primary or secondary amines with quaternary ammonium carbonyl or sulfonyl chlorides, such as N-chloro-N-phenyl betainyl chloride (Example 5), N-chloro-trimethylamino methyl beta-naphthoyl chloride (Example 6), meta-(omega-N-chloropyridyl acetyl)-aminobenzoyl chloride (Example 7), and phenyl benzyl dimethyl ammonium sulfate sulfone chloride (Example 9) described in my copending application previously referred to.

EXAMPLE 6

*N-chloro-C-tetradecyl betaine amide*

41.6 parts of N-chloro-C-tetradecyl betainyl chloride (prepared according to Example 4 of my aforementioned copending application) is dissolved in 900 parts of dry benzene, and the mixture saturated with dry ammonia gas for 4 hours.

The crude product is recovered by filtration and washed with 1200 parts of dry acetone. The N-chloro-C-tetradecyl betaine amide is separated from inorganic salts by extracting the crude filter cake with a solution of 400 parts of acetone and 120 parts of methyl alcohol. The purified product is recovered by evaporating the extract at 60–65° under vacuum. Further purification is carried out by crystallization from 200 parts of dry acetone. The final product melts at 92–96° C. and exhibits pronounced surface active properties in aqueous solution. Aryl amides such as the anilide, naphthalide and alkyl amides such as the butylamide, methyl amyl amide, etc. are synthesized in a similar manner. Heating is usually necessary to bring the reaction between N-chloro-C-tetradecyl betainyl chloride and substituted amines to completion, however.

EXAMPLE 7

1-(N-chloro-betainyl)-amino-4-(N-chloro-betainoxy)-anthraquinone

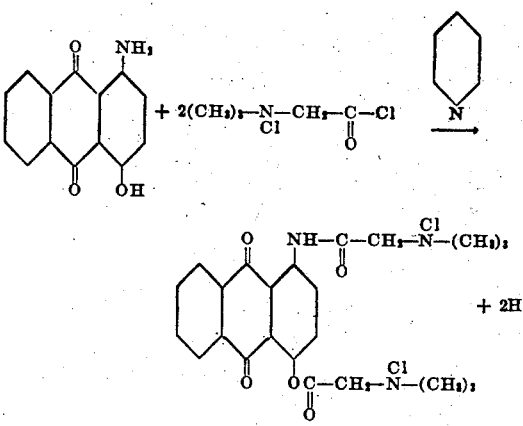

Twenty-two parts of 1-amino-4-hydroxy-anthraquinone is dissolved in 200 parts of pyridine. To this solution is added 38 parts of N-chloro betainyl chloride (prepared according to Example 1 of my aforementioned copending application), and the mixture heated to 80–85° C. The reaction is held on temperature for 2 hours, then boiled under reflux for 3½ hours. Cool the mixture to room temperature and drop in 80 parts of methyl alcohol and filter off the crystalline precipitate, which is then washed with 80 parts of methyl alcohol. Twenty-five parts of crude product which may be further purified by crystallization from methyl alcohol is obtained.

The process can be applied also to the synthesis of a variety of betainyl derivatives of condensed ring amino compounds, such as 1,4-dimethyl-amino-anthraquinone, 1,4,5,8-tetra-amino-anthraquinone, 1-amino-benzanthrone, 1-amino-anthraquinone, 1-benzoylamino-5-amino-anthraquinone, 1-amino-4-paratoluidino-anthraquinone, diamino-dibenzanthrone, etc. Other quaternary ammonium carbonyl or sulfonyl halides such as described in my copending application referred to heretofore, condense in a similar manner to produce the corresponding quaternary ammonium substituted amides.

EXAMPLE 8

4-(N-chloro-betainylamino)-azo-benzene

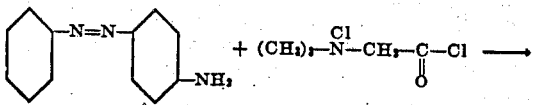

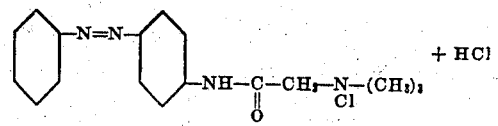

17.2 parts of N-chloro-betainyl chloride and 19.7 parts of 4-amino-azo-benzene are suspended in boiling benzene. The mixture is heated until hydrochloric acid is no longer evolved (2–4 hours), and the product is recovered by filtration. The crude material is purified by extraction with 40 parts of methyl alcohol. The soluble fraction is recovered by evaporation of the extract, and crystallized from dry acetone. The purified 4-(N-chloro-betainylamino)-azo-benzene is obtained in the form of water soluble yellow needles which melt at 212–214° C.

Analysis: Percent nitrogen—found 16.27—theory 16.8; percent chlorine—found 11.02—theory 10.65.

Analogous results are obtained with other azo derivatives. For example, 24 parts of 4-amino-4'-nitro-azo-benzene and 22 parts of N-chloro-betainyl chloride are suspended in a solution of 160 parts of toluene and 8 parts of pyridine, and boiled under reflux for 15 minutes. The product is recovered by filtration and purified by crystallization from methyl alcohol. The purified 4-(N-chloro-betainylamino)-4'-nitro-azo-benzene melts with decomposition at 250° C. and contains one molecule of methyl alcohol of crystallization.

Analysis: Percent nitrogen found 17.4—theory 17.1; percent chlorine found 8.90—theory 8.67.

The azo pigment obtained by coupling diazotized meta-amino-phenyl biguanidine to 2-hydroxy-3-naphthanilide condenses under similar conditions to produce a water soluble scarlet dye. A variety of azo dyes containing primary or secondary amino groups may be condensed with quaternary ammonium substituted carbonyl or sulfonyl halides such as the above N-chloro-betainyl chloride to yield the corresponding quaternary ammonium substituted amides. Furthermore, the azo dye may be further substituted by sulfonic acid, or carboxyl groups, which may impart initial water solubility.

EXAMPLE 9

2-(N-chloro-betainylamino)-6-chloro-benzothiazole

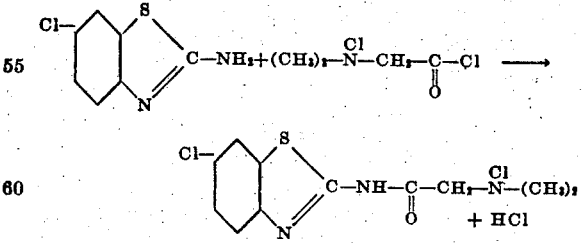

One hundred fifty parts of 2-amino-6-chloro-benzothiazole and 170 parts of N-chloro-betainyl chloride are suspended in 800 parts of toluene and boiled under reflux for 3 to 4 hours, or until hydrochloric acid is no longer evolved. A theoretical yield of product is recovered by filtration. Purification by crystallization from water yields the monohydrate.

Analysis: Percent nitrogen—found 11.96—theory 12.32; percent chlorine—found 20.87—theory 20.82.

Similar results are obtained by condensing meta-amino-phenyl methyl pyrazolone with N- chloro-betainyl chloride. The meta-(N-chloro-betainylamino)-phenyl methyl pyrazolone couples with para-nitrobenzene diazonium chloride to yield a water soluble yellow dye.

Analysis: Percent nitrogen—found 19.48—theory 20.7.

Other heterocyclic derivatives containing primary or secondary amino groups such as alpha amino-pyridine, 3-amino-carbazole, 4-amino-anthrapyridone, amino-acridines, etc. condense with various quaternary ammonium substituted carbonyl or sulfonyl halides such as those described in my aforementioned copending application, to give the corresponding amides.

Example 10

*N-chloro-betainyl distearamido methane*

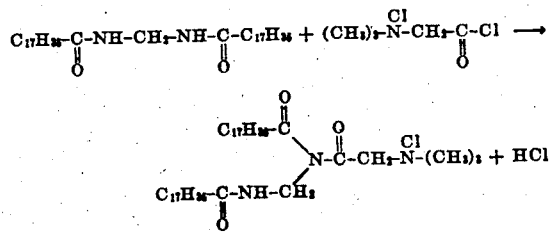

17.3 parts of distearamido methane and 12.0 parts of N-chloro-betainyl chloride are suspended in 86 parts of toluene and the mixture boiled under reflux for 2 hours. The mixture is cooled to room temperature, and the insoluble material removed by filtration. The product is recovered from the toluene by evaporating the solvent on a steam bath and freed of impurities by trituration in 80 parts of dry acetone. The washed product is obtained as white flakes, is soluble in hot water and melts at 126–131° C.

Analysis: per cent nitrogen—found 5.82—theory 5.89; per cent chlorine—found 4.97—theory 4.97.

In general, alkylamines such as methyl stearylamine, dioctylamine, butylamine and aralkylamines such as benzyl dodecylamine and arylamines such as para-octadecyl aniline, etc. and substituted amines such as stearoyl ethylene diamine, benzoyl hexamethylene diamine condense with N-chloro-betainyl chloride, or other quaternary ammonium carbonyl or sulfonyl halides such as described in the previously mentioned copending application. Pyridine, quinoline, dimethyl formamide, dimethyl aniline, etc. are also excellent reaction mediums in which to carry out these condensations.

Example 11

*Octa-(pyridino-acetyl)-tetra-amino-copper phthalocyanine octa chloride*

Fourteen parts of octa (chloro-acetyl) tetramino-copper phthalocyanine (prepared by heating tetramino copper phthalocyanine with excess chloro acetyl chloride in the presence of zinc chloride) are suspended in 60 parts of pyridine. An exothermic reaction is obtained. When the heat of reaction has subsided, the mixture is heated to boiling under reflux, and held on temperature for 4 hours. The product is recovered by filtration and washed with dry acetone until free of pyridine. A quantitative yield of water soluble material which dyes cotton and wool in bright, yellow-green shades is obtained. Dyeings on tannin mordanted cotton are especially fast to washing and to sunlight.

Analysis: per cent copper—found 3.30—theory 3.37; per cent nitrogen—found 14.85—theory 14.84.

Example 12

*Di-(N-chloro-pyridino-acetyl)-tetramino-copper phthalocyanine*

Ten parts of tetramino copper phthalocyanine are suspended in 85 parts of pyridine. Then over a half hour period, under good agitation, 7.5 parts of chloro-acetyl chloride are dropped into the mixture. After the heat of reaction has subsided, the mixture is heated to boiling under reflux, and held on temperature 4 hours. After cooling to room temperature, the mixture is filtered and the cake washed with alcohol to remove excess pyridine. A quantitative yield of a water soluble dye is obtained. Dyeings on tannin mordanted cotton are grey-green in shade and exhibit excellent wash, light and bleach fastness properties.

Analysis: Per cent chlorine—found 7.43—theory 7.48.

The corresponding betainyl tetramino copper phthalocyanine chloride is prepared in a similar manner. In place of chloro-acetyl chloride, N-chlorobetainyl chloride is condensed with tetramino copper phthalocyanine in pyridine. One, two, three or four betainyl groups may be introduced, depending upon the amount of N-chloro-betainyl chloride used in the condensation. These derivatives are likewise soluble in water, and exhibit valuable dyeing properties.

A great variety of pentavalent nitrogen acyl derivatives of tetramino copper phthalocyanine can be prepared by the above method and using the quaternary ammonium substituted carbonyl and sulfone halides disclosed in the aforementioned co-pending application. Mixtures of two or more quaternary ammonium carbonyl and sulfonyl halides likewise may be employed to produce dyes exhibiting valuable dyeing properties.

Furthermore, a variety of acyl halides containing an active halogen atom, such as, alpha-bromo-butyryl bromide, alpha-chloro-propionyl chloride, para-chloromethyl benzoyl chloride, alpha bromo stearoyl chloride, etc. condenses with tetramino copper phthalocyanines to produce the corresponding mono, di, tri and tetra quaternary ammonium substituted amides.

The scope of the reaction is not limited to amino copper phthalocyanine, but likewise includes metal free tetramino phthalocyanine, tetramino lead phthalocyanine, tetramino magnesium phthalocyanine and other metal derivatives.

Example 13

*Tri-(N-chloro-pyridino acetyl) tetramino copper phthalocyanine*

4.5 parts of trichloro-acetyl tetramino copper phthalocyanine (prepared by condensing 10 parts of tetramino copper phthalocyanine with 7.5 parts chloro-acetyl chloride in 45 parts of boiling toluene) is suspended in 30 parts of pyridine. The mixture is heated to boiling under reflux and held on temperature 3 hours. After cooling, the product is recovered by filtration and washed with alcohol to remove excess pyridine. The crude product is extracted with water to separate from insoluble impurities, and recovered from the aqueous extract by evaporation. The product dyes tannin mordanted cotton in strong, blue-green shades fast to light and washing.

Analysis: percent nitrogen found 16.43—theory 16.27.

This procedure may be applied to metal phthalocyanine derivatives containing less than four amino groups. For example diamino copper phthalocyanine may be condensed with chloro-acetyl chloride in pyridine to yield either the mono or di (N-chloro-pyridino-acetyl)-diamino copper phthalocyanines, depending upon the quantity of chloro-acetyl chloride employed. As in the case of tetramino metallo-phthalocyanines, either the chloro-acetyl derivative may be prepared first, then quaternized with a tertiary amine such as pyridine, triethanolamine, dimethyl cyclohexylamine, morpholine, etc., or both reactions may be carried out simultaneously, with an acyl chloride containing a reactive halogen atom and an excess of the amine as the condensing agent.

It is to be understood that the above examples are but a few of the many embraced within the scope of this invention, and that they are given merely for purposes of illustration. Without departing from the ambit of this invention numerous modifications of the described reactants and conditions of reaction may be made.

The reaction temperature may be varied over a wide range although temperatures within the range of 20° C. to 220° C. are generally preferred. In some instances temperatures below 20° C. may be used particularly where it is desired to avoid or minimize undesirable side reactions. In the same manner, temperatures above 220° C. may be maintained particularly in cases wherein it is desired to speed up the reaction, provided that the reactants and desired products do not seriously decompose at such temperatures.

For optimum results over a wide range of conditions and reactants, the reaction is generally carried on at normal atmospheric pressure. Superatmospheric and subatmospheric pressures are, however, contemplated and may be used if desired. Subatmospheric pressures facilitate the removal of volatile reaction products such as hydrohalic acids and solvents. Where it is desired to minimize the removal of volatile components superatmospheric pressures may be employed.

While the invention is not limited to any particular proportion of reactants, it is generally more economical to employ one molecular equivalent of quaternary ammonium compound for each primary or secondary nitrogen group which it is intended to amidate. An excess of about 10% to about 50% of quaternary ammonium acid halide is ordinarily sufficient to assure complete reaction, if that is desired. It should be understood that each nitrogen group present in a polyamino substituted molecule, or each chlorine of a poly chloro-acetylamino derivative need not be converted to a quaternary ammonium substituted amide in order to attain the desirable results of this invention. For example, para-phenylene diamine may be condensed with one mole of N-bromo-betainyl bromide to produce a product of many advantages, in accordance with this invention.

The use of an inert diluent is usually advisable in order to provide sufficient physical contact between the reactants to insure complete conversion, but it should be understood that it is not essential. Some reactions contemplated herein may be carried out by fusing the reactants together instead of using a diluent. Likewise, an excess of either of the reactants may be employed to lower the fusing temperature. In still other cases, a condensing agent such as pyridine, dimethyl aniline, diethyl cyclohexylamine, morpholine, triamylamine, triethanolamine, dimethyl formamide, piperidine, quinoline, and the like may be employed as acid acceptors, and when used in excess may serve as diluents for the reaction. The condensing agent may be used in conjunction with an inert diluent, or an excess of the primary or secondary amine may be employed as a condensing agent.

It is not essential that either of the reactants be soluble in the diluent or condensing agent in order to obtain efficient condensation. No specific quantity of diluent or condensing agent is required, although it is advisable to employ a sufficient amount of condensing agent to absorb the hydrohalic acids produced. There are many diluents and mixtures of diluents which may be satisfactorily used, for example, hydrocarbons such as petroleum naphtha, kerosene, benzene, toluene, xylene, decalin and cyclohexane; chlorinated hydrocarbons such as chloroform, chlorobenzene, ethylene dichloride; nitro hydrocarbons such as nitropropane, nitrobenzene, nitrotoluene; esters such as ethyl acetate, methyl butyrate; ethers such as dioxane, diethyl ether, glycol diethyl ether and the like.

Numerous quaternary ammonium derivatives are contemplated for use in accordance with the present invention. These derivatives, as previously mentioned, are described in considerable detail in a copending application filed July 20, 1942, Serial No. 451,682, entitled "Organic quaternary ammonium derivatives." Most of them conform to the following general formula:

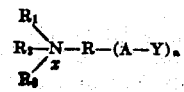

in which R=a bifunctional organic radical connecting N with A.

Examples of such groups are alkylene, cycloalkalene, aralkylene, arylene, heterocyclic or two or more such groups which are like or unlike connected by

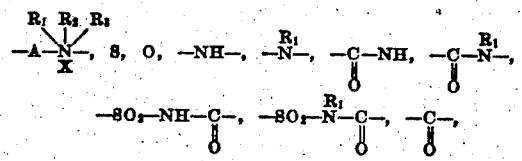

and their substitution products such as halogeno, nitro, nitroso, carboxyl, sulfonic, halogeno alkyl, alkoxy, etc.

$R_1$, $R_2$, $R_3$=alkly, cyclo-alkyl, aralkyl, aryl, heterocyclic, $R_1$ and R together with N form a heterocyclic ring, or $R_1$, $R_2$ and $R_3$ together with N form a heterocyclic ring, and their substitution products
X=anion
Y=fluorine, chlorine, or bromine

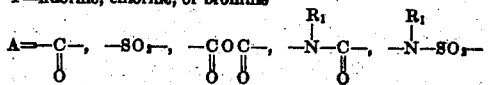

n=a small, whole number.

Primary and secondary organic amines which are contemplated for use herein have been described in considerable detail heretofore. In addition, it is of course understood that many other well known primary and secondary amines similar thereto or suggested thereby are also embraced within the scope of this invention.

The term "betaine compound" when used herein is understood to mean a compound characterized by a radical having the following general formula:

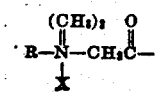

wherein R represents a hydrocarbon radical and X represents an anion.

It is understood that two or more of the aforesaid quaternary ammonium derivatives and/or primary organic amines and/or secondary organic amines may be used. By a selection of such combinations of quaternary ammonium derivatives and/or amines it is possible to further improve the desirable characteristics of the resulting condensation products for specific uses.

By means of the present invention it is possible to produce quaternary ammonium derivatives in a simple and economic manner. The use of the aforementioned organic quaternary ammonium derivatives in the preparation of these condensation products is greatly superior to the prior art amidation technique. The present invention permits one to amidate compounds while avoiding in most cases the use of a large excess of condensing media, such as pyridine, dimethyl aniline, etc. Furthermore, it renders unnecessary the employment of condensing agents such as thionyl chloride or phosphorus oxy chloride, which produce undesirable side reactions with the primary or secondary amine undergoing acylation.

This invention permits a much greater selection of quaternary ammonium acyl groups than have been hitherto available. In particular, it permits a wide choice of N and C substituted quaternary ammonium carbonyl and sulfonyl halides. These derivatives form a great variety of substituted amides having many desirable characteristics.

In accordance with this invention it is also possible to produce in a simple and very economical manner a variety of quaternary ammonium substituted sulfone amides by chloro sulfonation of an appropriate quaternary ammonium derivative and condensation of the resulting product with a primary amine.

The expression "phthalocyanine radical" when used herein is understood to mean phthalocyanine from which hydrogen has been removed. The structure of this material is given in Industrial and Engineering Chemistry 31, at page 842. It is believed that the hydrogen atoms are removed therefrom at the meta positions in each of the benzene rings and in place thereof amino groups are substituted to produce the compounds of the present invention.

An entirely new class of dyestuffs of appreciable value is obtained in accordance with this invention by reacting an amino phthalocyanine with a quaternary ammonium substituted carbonyl or sulfonyl chloride or by acetylating the amino phthalocyanine with a carbonyl or sulfonyl chloride containing an active halogen atom and condensing with a tertiary amine, such as pyridine, triethanolamine, trimethylamine, etc., to form the water soluble quaternary ammonium derivatives. These dyes exhibit unusual light fastness and produce desirable shades on cotton, wool, rayon, etc.

As many apparently widely different embodiments of this invention may be made without departing from the spirit and scope thereof, it is to be understood that the invention is not limited to the specific embodiments thereof except as defined in the appended claims.

I claim:

1. A process which comprises condensing an amino phthalocyanine dye with a quaternary ammonium compound containing a carbonyl chloride group.

2. A process which comprises condensing a pre-prepared betaine compound containing a condensable acid halide group with an amine.

3. A process which comprises condensing a prepared betaine compound containing a condensable acid halide group with an aromatic amine.

4. A process which comprises condensing a pre-prepared betainyl chloride with an amino phthalocyanine dye.

ADRIAN LAVERNE LINCH.